March 4, 1952  E. R. PRICE  2,587,892
TRANSMISSION OPERATING MECHANISM
Filed March 5, 1947  4 Sheets-Sheet 1

Fig. 1.

INVENTOR.
EARL R. PRICE
BY
H. O. Clayton
ATTORNEY

INVENTOR
EARL R. PRICE
BY H. O. Clayton
ATTORNEY

Inventor
EARL R. PRICE
BY H. O. Clayton
ATTORNEY

Patented Mar. 4, 1952

2,587,892

UNITED STATES PATENT OFFICE 2,587,892

TRANSMISSION OPERATING MECHANISM

Earl R. Price, South Bend, Ind., assignor to Bendix Aviation Corporation, South Bend, Ind., a corporation of Delaware Application March 5, 1947, Serial No. 732,635

10 Claims. (Cl. 192—.073)

This invention relates in general to the power transmission mechanism of the power plant of an automotive vehicle and in particular to power and manually operated means for operating the change speed transmission of said power plant and for operating the throttle and the friction clutch to facilitate the operation of the transmission.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission and the operation of the throttle and friction clutch to facilitate said settings, being effected by power means if the driver elects this operation of the mechanism.

A further object of my invention is to provide, in an automotive vehicle including a fluid coupling, an accelerator, a friction clutch, an engine controlling throttle, a three speeds forward and reverse transmission, and a gear shift lever, means for operating and for facilitating the operation of said transmission, said means including power means, comprising a single acting motor, which is automatically operable, when the gear shift lever is placed in a certain position and after the accelerator is released, to establish the transmission either in its second gear setting or its high gear setting depending upon the speed of the vehicle, the friction clutch and the throttle being operated by said motor to facilitate this operation of the transmission, said means further including manually operated means for effecting any one of the gear settings of the transmission.

However, the most important feature of my invention lies in the provision of means, including a clutch pedal operated switch mechanism, for making it possible, at the will of the driver, to overrule the vehicle speed responsive control of the aforementioned mechanism whereby a power operated second gear setting of the transmission may be effected when the vehicle is travelling above governor speed.

Yet another object of my invention is to include, in the aforementioned transmission operating mechanism, an intake manifold vacuum operated switch mechanism and an intake manifold vacuum operated throttle closing mechanism, the last two mechanisms improving the automatic operation of the mechanism of my invention.

Other objects of the invention and desirable details of construction and combination of parts of the aforementioned mechanism, including the provision of a transmission controlling dash pot mechanism, will become apparent from the following description of a preferred embodiment of by invention, which description is taken in conjunction with the accompanying drawings, in which:

Figure 1:
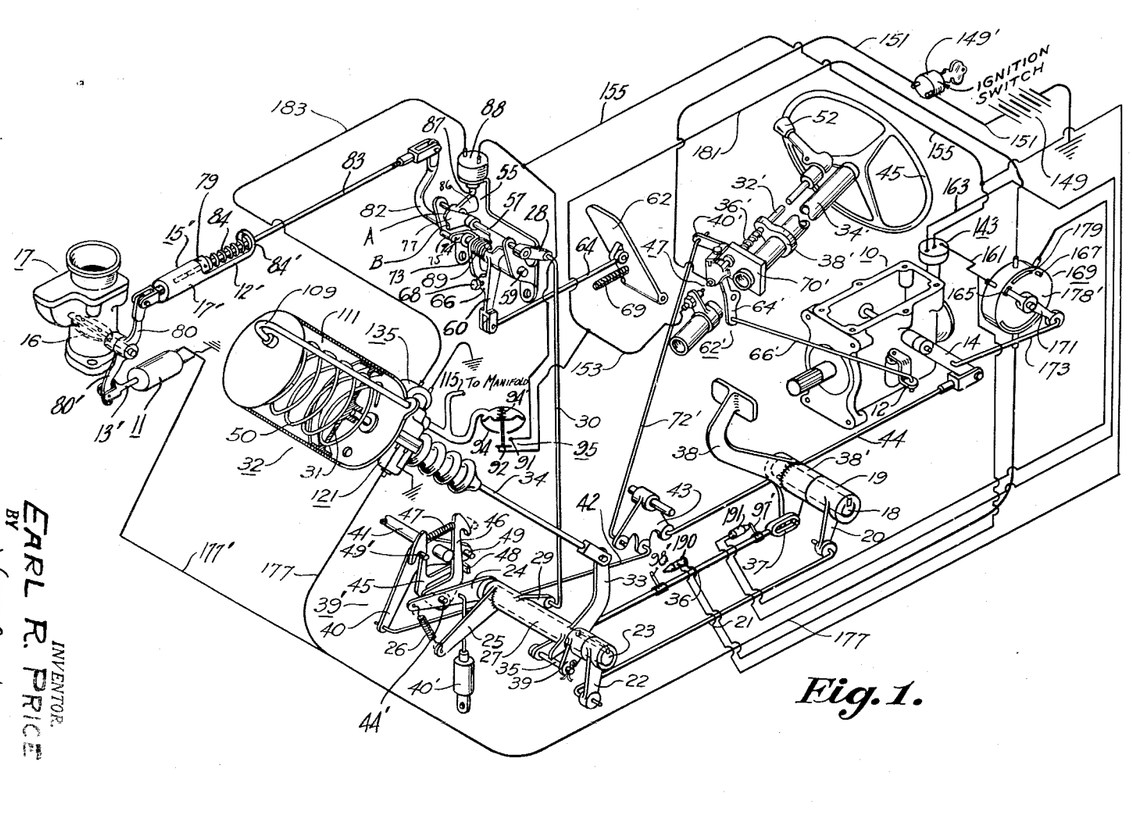
Figure 1 is a diagrammatic view of my invention disclosing the principal features thereof.

Referring now to Figure 1 disclosing a preferred embodiment of my invention, a three speeds forward and reverse transmission 10, of any well known design is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14, for operating the engine throttle valve 16 of the carburetor 17, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings. The mechanism of my invention also preferably includes, in the power plant of the vehicle, a fluid coupling such for example as that which was incorporated in several 1941 and 1942 passenger vehicles and said coupling includes an impeller and a vaned rotor the latter serving to drive the aforementioned driving plate of the clutch.

The friction clutch, not shown, is operably connected to a clutch throw out shaft 18 to which is keyed a sleeve 19; and to a crank 20, fixedly secured to said sleeve, there is pivotally connected a rod 21. The rod 21 is pivotally connected to crank 22 which is keyed to a shaft 23 and upon one end of the latter shaft there is rotatably mounted a crank 24. The latter crank is yieldingly connected to a crank 25 by means of a spring 26; and to the crank 25 there is connected a sleeve 27 rotatably mounted on the shaft 23. The sleeve 27 is operably connected to a crank 28 by means of a crank 29 fixedly secured to said sleeve, and a rod 30 which is pivotally connected to the cranks 28 and 29.

The sleeve 27 is operably connected to a piston 31 of a pressure differential operated motor 32, by means of a two-armed crank 33 fixedly connected to said sleeve and by means of a rod 34 pivotally connected at one of its ends to the longer arm of the crank 33 and secured at its other end to the piston. The shorter of the two arms of the crank 33 abuts a pin 35 which is rotatably mounted, at one of its ends, in one end of a rod 36 said rod being connected at its other end, by a lost motion connection 37, to a manually operable clutch pedal 38. This pedal, constructed as a two-armed crank member, is rotatably mounted on the shaft 18 and is fixedly secured to a sleeve 38' which is also rotatably mounted on said shaft. The other end of the pin 35 is pivotally connected to a crank 39 which is keyed to the shaft 23.

There is thus provided manually and power operated means for operating the clutch, the clutch pedal 38, by virtue of the operation of the lost motion connection 37, remaining stationary when the motor 32 is energized to disengage the clutch.

Describing now the connection between the motor 32 and the transmission operated crank 14, as is described above the piston 31 of said motor is operably connected to the crank 24 said connection being yieldable by virtue of the operation of the spring 26; and said crank 24 is connected to the transmission operating crank 14 by means of an alternator, that is, direction changing mechanism indicated as a whole in Figure 1, by the reference numeral 39'. This alternator preferably comprises a bell crank lever 40 pivotally mounted upon a support shaft 41; and one arm of said lever is pivotally connected, by a rod 42, to one of the arms of a three-armed crank 43. Another of the arms of the latter crank is connected to the transmission operating crank 14 by means of a rod 44. Two juxtaposed claw members 45 and 46 are pivotally connected, at their lower ends, to a pin 44' which extends through the crank 24; and the claw member 46 is biased, by a compression spring 47, into engagement with one end of a stop member 48 extending from and secured to the claw member 45. A pin 49, adapted to nest within the hooked end of the claw 46, is fixedly mounted on the end of the lever 40.

Describing the operation of the alternator 39', when the motor 32 is energized the piston 31 moves upwardly, Figure 1, thereby effecting a counterclockwise rotation of the crank 25. The first increment of movement of the piston serves to disengage the clutch and control the operation of the throttle, the latter operation being described hereinafter, and during this operation the spring 26 is expanded there being no movement of the crank 24 until the clutch plates have been separated, that is, until the driving torque of the power plant has been reversed. After the clutch plates are separated the expanded, that is, cocked spring 26 then serves to rotate the crank 24 counterclockwise thereby bodily moving the claws 45 and 46 downwardly as a unit; and this operation serves to rotate the bell crank lever 40 in a counterclockwise direction the hooked end of the claw 45 effecting this operation by virtue of its contact with a pin 49' mounted in one arm of said bell crank lever. This downward movement of the crank 24 to effect an operation of the transmission is preferably cushioned by the operation of a dash pot 48'; and it is also to be noted that as the pin 49 and the end of the claw 46 simultaneously move toward each other that the pin 49 rides upon the outer face of said claw to the dotted line position disclosed in Figure 1, the spring 47 being compressed during said operation to move the claw 46 away from the stop 48.

Now it will be apparent that this counterclockwise rotation of the lever 40 serves to place the rod 42 in compression to rotate the crank 43 counterclockwise thereby placing the rod 44 in compression and rotating the transmission operating crank 14 to establish the transmission in a new setting; and it is to be added that when the crank 24 is moved toward the crank 25 by the contracting operation of the spring 26, that the two cranks are then being rotated as a unit by the continued upward movement of the motor piston 31 as it moves to its upper end position in the motor 32.

Continuing the description of the operation of the alternator 39' when the motor 32 is de-energized, an operation which is initiated as the operation of the transmission is being completed, a return spring 50 within the motor, aided by the clutch engaging operation of the clutch springs, not shown, serves to rotate the cranks 24 and 25 clockwise as a unit the latter crank contacting the pin 44'; and this operation serves to move the claws 45 and 46 upwardly as a unit the spring 47 functioning to rotate the claw 46 clockwise after the end of said claw has cleared the pin 49. The latter pin is then nested within the hook-shaped end of the claw 46. It is apparent therefore that when this preselecting operation of the alternator is completed the parts are in position to effect a clockwise rotation of the lever 40 when the motor 32 is again energized. There is thus provided by the alternator 39' a direction changing mechanism to alternately effect a clockwise and a counterclockwise rotation of the transmission operating crank 14 by the energization of the motor 32.

Describing now that part of the mechanism of my invention which is actuated by a manually operated gear shift lever 52, Figure 1, said mechanism includes a rotatable and bodily movable shaft 32' extending alongside the steering column 34' of the vehicle. As is disclosed in Figures 1, 6 and 7, the shaft 32' is biased downwardly by a spring 36' positioned between a stop 38' mounted on the steering column and a crank member 40' which is operably connected to said shaft by means of a clutch mechanism 42' described hereinafter. The shift lever 52 mounted beneath the steering wheel 45 is so connected to the shaft 32' that a rotation of said lever in a plane parallel to said wheel effects a rotation of said shaft about its longitudinal axis in the operation of either neutralizing the transmission or establishing the same in a gear setting; and this connection between the shift lever and shaft 32', which incidentally was used on a 1942 car, is also such that the cross-shift movement of the shift lever, that is, the movement in a plane perpendicular to the plane of the steering column, results in a movement of the shaft 32' to either effect a shift rail selecting operation of the crank 12 or effect a declutching operation of the clutch 42' and a closing of a selector switch 47 to prepare the mechanism for its power operation.

Describing the aforementioned clutch mechanism 42', said mechanism includes a member 44' sleeved over the lower end of the shaft 32', said member being permanently secured in place to the crank 40'. The lower end portion of the member 44' is provided with a flange 46' which is recessed at 48', Figure 8, to provide a keyway for a key portion 50' of a spool-shaped end portion of a clutch member 52', said member being sleeved over and drivably connected by splines 54' to the end portion 56' of the shaft 32'. A nut 58', threaded on the end of the shaft portion 56', serves as a stop for the clutch mechanism which is biased downwardly by the operation of the spring 36'.

The upper arm 60' of a bell crank lever 62' fits within the spool-shaped portion of the clutch member 52' and the lower arm 64' of said lever is pivotally connected, by a link 66', to the shift rail selecting crank 12. As is disclosed in Figure 6, the spring 36' serves to bias the clutch 42' and shaft 32' as a unit downwardly, the movement being limited by a stop 68', Figure 7, constituting a part of a steering column mounted bracket member 70'; and in this position of the clutch 42' the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is, a selection of the low and reverse gear shift rail of the transmission, the driver lifts the shift lever 52 upwardly in a plane perpendicular to the plane of the steering wheel; and this operation serves to rotate the bell crank lever 62' in a counterclockwise direction, Figure 6, the spring 36' being compressed and the flange 46', Figure 7, being moved into engagement with the stop 68'. To actuate the shift rail operating crank 14 to neutralize the transmission or establish the same in any one of its four gear ratio settings, the driver rotates the shift lever 52 in a plane parallel to the plane of the steering wheel thereby effecting an angular movement of the crank 40' which is preferably connected to the crank 14 by force transmitting means including link 72', the aforementioned three-armed lever 43 and the link 44.

There is thus provided, by the above described mechanism, means for manually operating a three speeds forward and reverse transmission; and in this manual operation of the transmission the shift lever 52 is movable to six different positions, said selective movement outlining the letter H.

Referring now to Figure 1, there is disclosed therein details of certain other controls of the mechanism. A bracket 55 serves as a mounting for a shaft 57 and a shaft 59 said shafts being journalled in the sides of said bracket. The shaft 59 is operably connected to the throttle valve 16 by a crank 82, a crank 80, a link 83 and an electromagnetically operated throttle closing mechanism including a lost motion connection 15'. This throttle closing mechanism includes a grounded solenoid 11 electrically connected to the conductor 177 by a conductor 177'; and the armature, not shown, of this solenoid is connected to a throttle operating crank 80' by a link 13'. The crank 80' is operably connected to the link 83 by the connection 15' which includes a member 17' pivotally secured at one of its ends to said crank and bored to slidably receive one end of the rod 83. A spring 84, sleeved over the rod 83, is interposed between a stop 79 secured to the rod 83, and a flange member 84' of a support member 12' extending from the member 17'. There is thus provided power operated means for maintaining the throttle 16 closed despite a depression of the accelerator. The operation of this mechanism and its cooperation with the other elements of my invention will be described in greater detail hereinafter.

A crank 60, rotatably mounted on the shaft 59 and operably connected to the accelerator 62 of the car by a link 64, is provided with a laterally extending flange 66 within which is adjustably mounted stop member 68. This stop member is biased, by the operation of a spring 89 and an accelerator return spring 69, into engagement with a flange member extending laterally from a fitting 73 fixedly secured to the shaft 59; and from the fitting 73 there extends a flange 74 which is provided at its end with a roller member 75. This roller member is adapted to contact a cam 77 which is fixedly mounted on the shaft 57; and mounted alongside the cam 77 there is provided a cam 86 which is also secured to the shaft 57. The cam 86 contacts a pin 87 extending from the movable contact, not shown, of a breaker switch 88; and this contact is biased, by a spring, not shown, to its switch open position and is moved to its switch closed position by the cam 86 which is shaped to effect a closing of the switch during a part of the clutch engaging movement of the motor piston 31. There is provided by the switch 88 and the cam means for operating the same, means for controlling the operation of a choke valve operating solenoid 135, Figure 5, to effect a controlled clutch engaging operation of the motor 32. The parts, including the contour of the face of the cam 86, are preferably so constructed and arranged and so operative that the solenoid 135 is energized, to move a valve member 131 away from a seat 137, during the clutch engaging movement of the piston 31 said operation being effected just as the piston reaches the point of clutch plate contact; and as stated above the parts are also so constructed and arranged and so operative that the switch 88 is subsequently opened, to effect a de-energization of the solenoid 135, during said clutch engaging movement of said piston. When the valve 131 is moved off of a seat 139, Figure 5, air rushes into the motor 32 at a relatively high rate to thereby effect a relatively rapid clutch engaging movement of the clutch driven plate, and when the valve 131 is seated air flows into the motor 32 via a relatively small opening 10'. The solenoid 135 and valve means for controlling the operation of the motor 32, are described in greater detail hereinafter.

Continuing the description of the mechanism disclosed in Figure 1, the spring 89 is sleeved over the hub of the crank 60 and is connected at one of its ends to the member 73; and the other end of said spring abuts the outer face of the flange 66 on said crank. There is thus provided, by the unit 15' and the spring 89 and cooperating parts including the cam 77, means, interconnecting the accelerator and throttle whereby the accelerator may be depressed without effecting an opening of the throttle when the motor 32 is energized to successively disengage the clutch and operate the transmission; for with the first increment of clutch disengaging movement of the piston 31, the cam 77 is rotated counterclockwise, Figure 1, thereby providing, by its end portion A, a stop to prevent a clockwise rotation, that is throttle opening movement, of the accelerator operated flange 74. It is to be noted at this juncture that when the accelerator is depressed to cock the spring 89 and the motor 32 is de-energized to effect a re-engagement of the clutch the cam 77 is rotated clockwise, Figure 1, to effect a controlled opening of the throttle as the clutch plates move into contact with each other, a segment B of said cam being shaped to effect this operation. Preferably all points along the segment A of the cam 77 are equally distant from the center of rotation of said cam; and the radius of the cam portion B progressively decreases to effect the above described control of the throttle. There is provided, by the operation of the sector A of the cam 77, a stop means operative to prevent an opening of the throttle when the clutch is being disengaged and during the engagement of the clutch as the driven clutch plate moves up to a point just short of engagement with the driving clutch plate; and the subsequent operation of the segment B of said cam serves to make possible a progressively increased opening of the throttle, by the operation of the accelerator loaded spring 89, as the clutch plates move into driving engagement with each other. The electromagnetically operated throttle controlling unit 15' serves to supplement the operation of the portion A of the cam 77; that is the operation of maintaining the throttle closed as the clutch is being disengaged and the transmission operated.

Figures 3, 4, 5:
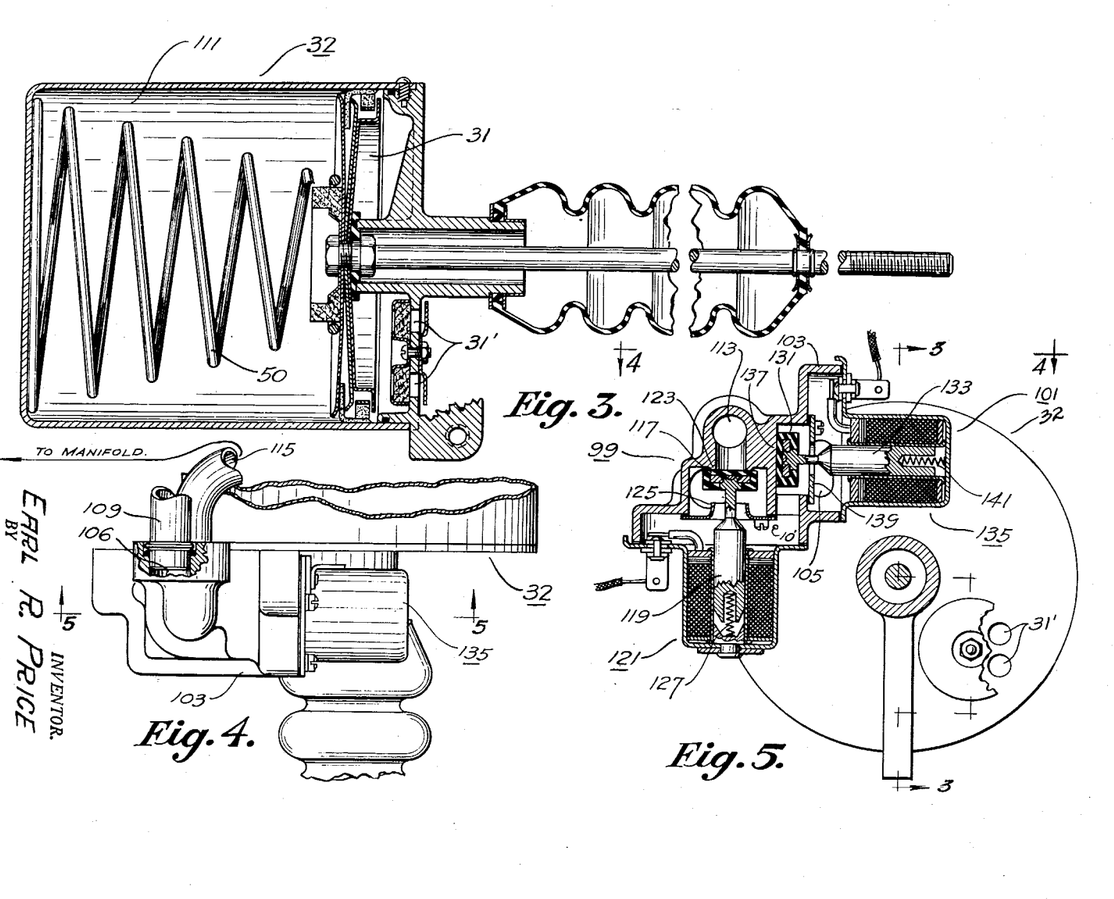
Figure 3 is a sectional view, taken on the line 3—3 of Figure 5, disclosing details of the pressure differential operated motor of my invention.
Figure 4 is a view, partly in section and taken on the line 4—4 of Figure 5, disclosing details of the air transmitting ducts constituting part of the motor unit disclosed in Figure 3 and Figure 5.
Figure 5 is a view, largely in section, disclosing details of the solenoid operated valves for controlling the operation of the motor unit in Figure 3.

The valve means for controlling the operation of the motor 32 is disclosed in detail in Figure 5 and includes a three way valve unit 99 and a choke valve unit 101. Both units are housed within a casing 103 preferably mounted on the casing of the motor 32. The casing 103 is preferably ported at 105 to provide a vent to the atmosphere, at 106 to receive a duct 109 leading to a control compartment 111 of the motor, and at 113 to receive a conduit 115 leading to the intake manifold of the internal combustion engine of the vehicle or other source of vacuum. The three way valve unit 99 includes a valve member 117 operably connected to the armature 119 of a solenoid 121 which is secured to the casing 103. When the solenoid 121 is energized the valve member 117 is moved downwardly, Figure 5, to leave a seat 123 and abut a seat 125; and when said solenoid is de-energized a spring 127 serves to return the valve member to its seat 123. The choke valve unit 101 includes the aforementioned valve member 131 which is operably connected to the armature 133 of a solenoid 135 secured to the valve casing 103. As previously briefly described, when the solenoid 135 is energized the valve member 131 is moved off of a seat 137 onto a seat 139; and when the solenoid 135 is de-energized a spring 141 serves to return the valve member 131 to its seat 137.

Figure 2:
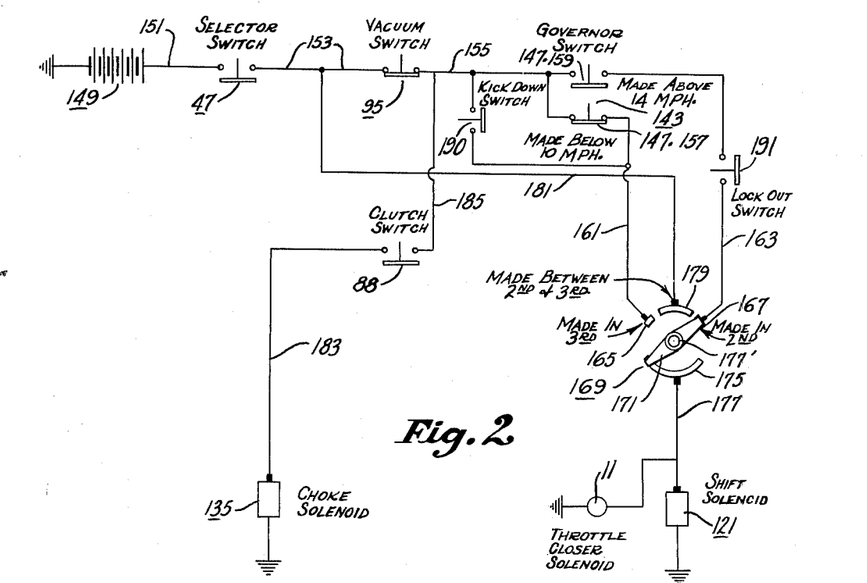
Figure 2 is a wiring diagram of the electrical mechanism disclosed in Figure 1.
Figure 9:
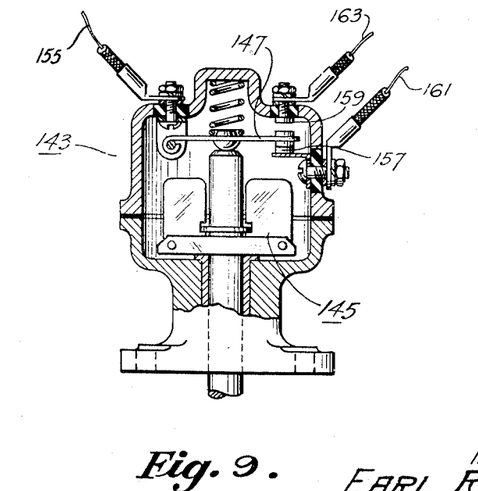
Figure 9 is a view disclosing details of the governor operated switch of the mechanism of my invention.

The electrical means for controlling the operation of the solenoids 121 and 135 constitutes the most important feature of my invention, said electrical means being disclosed in Figures 1, 2 and 9. Describing this control means the movable contact 147 of a single pole double throw switch 143, Figure 9, operated by a vehicle speed responsive centrifugally operated governor 145, is electrically connected in series with the manifold vacuum operated switch 95, the manually operated selector switch 47 and a grounded battery 149. Referring to Figures 1 and 2 the wiring interconnecting said switches and battery preferably includes an electrical conductor 151 interconnecting the battery 149 with the selector switch 47, a conductor 153 interconnecting the latter switch with the movable contact of the manifold vacuum operated switch 95, and a wire 155 interconnectig the fixed contact of the latter switch with the movable contact 147 of the governor operating switch 143. The latter switch includes fixed contacts 157 and 159 which are connected respectively by wires 161 and 163 to fixed contacts 165 and 167 of a motor operated selector switch mechanism 169. A movable contact 171 of the latter switch mechanism is operable as a crank and is pivotally mounted at its center upon a pin 177' extending from a switch box 178'; and to one end of the member 171 there is pivotally connected a link 173, Figure 1, which is pivotally connected to the transmission operating crank 14. The movable contact 171 is electrically connected to the solenoid 121 by a contact 175 and a conductor 177 connected to said member. A contact 179 of the switch 169 is electrically connected to the conductor 153 by a conductor 181; and it is important to note that the conductor 153 serves to electrically interconnect the switches 47 and 95; accordingly the contact 179 is electrically connected to the circuit interconnecting the switch 95 and battery at a point which lies between said switch and battery. The contacts 165 and 171, contacts 171 and 179 and the contacts 167 and 171 of the switch mechanism 169 provide three separate switches; and the movable contact 171 is so connected with the motor operated transmission operating crank 14 and said mechanism is so constructed that the switch 167, 171 is closed when the transmission is established in its second gear setting, the switch 165, 171 is closed when the transmission is established in its high gear setting, and the switch 171, 179 is closed during the vacuum operation of the motor 32. In other words, the switch 171, 179 is closed at all times, except when the transmission is completely or substantially completely established in either its second gear setting or its high gear setting.

There is also disclosed in Figure 1 a power operated switch 95 constituting one of the electrical controls of the mechanism of my invention. This switch, comprising a fixed contact 91 and a movable contact 92, is actuated by an intake manifold vacuum operated motor 94 comprising a power element which is operably connected to said movable contact. The latter contact is biased to its switch open position by a spring 94'. Describing the operation of the switch 95, when the accelerator is released to close the throttle valve 16, there is effected a substantial degree of intake manifold vacuum; accordingly, it follows that with this operation the motor 94 is energized to close the switch 95; and when the throttle valve is opened sufficiently to destroy or substantially destroy the intake manifold vacuum then the motor 94 is automatically de-energized and the spring 94' is then operated to open the switch 95.

Completing the description of the electrical control means of Figures 1 and 2 the grounded choke valve controlling solenoid 135 is wired to the motor operated clutch control switch 88 by a conductor 183 and said switch 88 is connected by a conductor 185 to the conductor 155 that is to a point in the electrical circuit lying between the manifold vacuum operated switch 95 and the governor operated switch 143.

Describing now that part of the mechanism constituting the most important feature of my invention, that is, the clutch pedal operated switch mechanism for overruling the governor operated switch 143, there is disclosed in Figure 1 a normally open breaker switch 190 and a normally closed breaker switch 191, both switches being suitably mounted adjacent the clutch pedal operated rod 36. The switch 190 is preferably actuated by a flange 98' mounted on the rod 36 and the switch 191 by a flange 97' mounted on said rod. The switches 190 and 191 are of conventional breaker switch construction; accordingly, the same are not disclosed in detail. Suffice it to say that the switch 190, which may be defined as a kickdown switch, includes a switch spring serving to bias a movable contact of the switch to its switch open position; and that the switch 191, which may be defined as a lock-out switch, includes a switch spring serving to bias a movable contact of the switch to its switch closed position.

Preferably the parts of the mechanism are so constructed and so positioned that the switch 190 is closed and the switch 191 opened when the clutch pedal is substantially depressed, the resistance of the aforementioned switch springs being such as to advise the driver of his operation of the switches. In other words, the operation of the switches is effected by a conscious effort on the part of the driver; for he wills an operation of said switches. The operation of the switches 190 and 191 and their cooperation with the remainder of the mechanism of my invention will be described in greater detail hereinafter.

Describing now the complete operation of the mechanism of my invention, and incidentally completing the description of the parts of said mechanism not heretofore described, it will be assumed that the three speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 38 to disengage the clutch and will then operate the shift lever 52 to manually effect said setting. The accelerator will then be depressed as the clutch is re-engaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation the shift lever 52, which at the time is in its second gear setting, is rotated downwardly that is angularly in a clockwise direction in a plane perpendicular to the plane of the steering wheel; and this operation serves to bodily move the shaft 32 downwardly until a movable contact member 224, Figure 6, of the selector switch 47 is in contact with a fixed contact 226 of said switch to close the same. This operation constitutes a declutching operation the clutch mechanism 42', the clutch member 52' moving away from the clutch member 44' the movement of the latter being prevented by the stop 68'.

Figure 6:
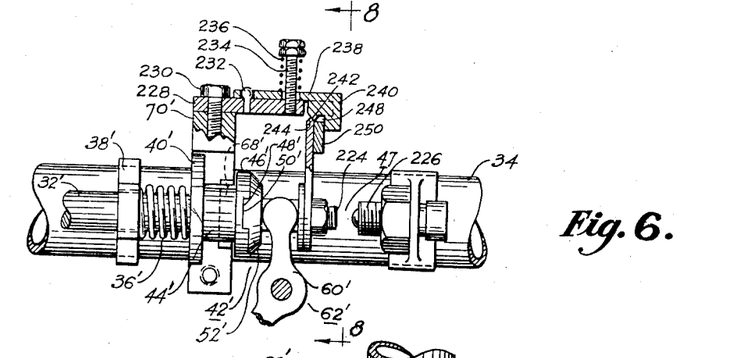
Figure 6 is an enlarged view of the mechanism at the base of the steering column, said mechanism serving to disconnect the shift lever from the power operated transmission operating linkage.
Figure 7:
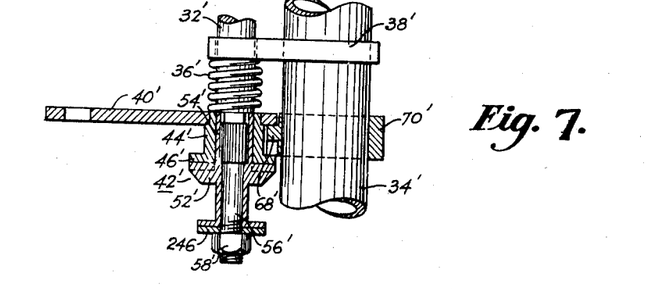
Figure 7 is a sectional view, taken on the line 7—7 of Figure 8, disclosing certain features of the mechanism disclosed in Figure 6.
Figure 8:
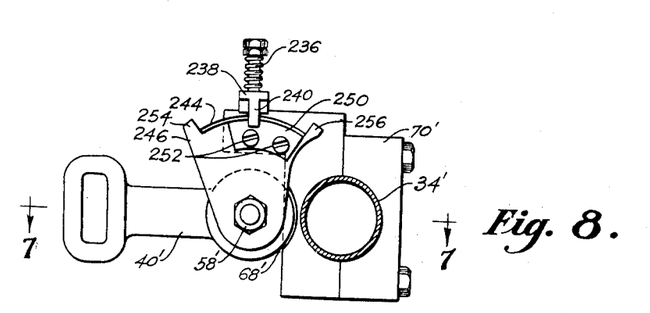
Figure 8 is a front view, taken on the line 8—8 of Figure 6, of the mechanism disclosed in Figure 6.

Referring to Figures 6 and 8 there is disclosed a latch mechanism for holding the shift lever in its automatic position, said mechanism including a relatively narrow rectangular shaped support member 228 preferably detachably secured to the bracket member 70' by a bolt 230; and there is mounted on said support member, by means of a guide pin 232, a bolt 234 and a spring 236, a movable latch member 238 shaped at its outer end to provide a relatively narrow stop member 240. Now when the shift lever 52 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56', Figure 7, between the lower flange portion of the clutch member 52' and the nut 58'; and this operation serves to position said peripheral edge portion 244 in the space indicated by the reference numeral 248, Figure 6. Incidentally the shift rail selecting mechanism of the transmission and the cooperating transmission parts are so constructed that the crank 62' may be moved beyond its second and high shift rail selective position in effecting the above described automatic setting of the shift lever.

Now at this juncture it is to be noted, from an inspection of Figure 8, that a rectangular shaped stop member 250, secured to the outer face of the stop member 246 by screws 252, is in contact with the member 240 when the parts are in their transmission neutral position and when the spring 36' has operated to move the crank 12 to its second and high shift rail position, that is the position preparing the transmission for either second or high gear operation. It follows therefore that the stop member 246 must be rotated clockwise in Figure 8 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 8 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Continuing the description of the operation of the mechanism the driver having moved the shift lever to its automatic position and assuming that the car is traveling above governor speed to close the switch 147, 159, Figures 2 and 9, the transmission will then be automatically established in its high gear setting after the driver releases the accelerator to close the throttle and thereby energize the motor 94 to close the switch 95; for with this operation an electrical circuit is completed via the grounded battery 149, an ignition switch 149', the then closed selector switch 47, the then closed manifold vacuum operated switch 95, the switch 147, 159 of the governor operated switch 143, the switch 167, 171 of the switch mechanism 169, and the grounded solenoid 121; and with this operation an electrical circuit is also completed to energize the solenoid 11 to close the throttle. The resulting operation of the three way valve 99, Figure 5, effects an energization of the motor 32 the piston 31 of said motor being then subjected to a differential of pressures to move the same to the left, Figures 1 and 3. The right side of the piston 31 is at all times subjected to the pressure of the atmosphere via screened openings 31' in one end of the motor 32; and the left side of said piston, that is, the side constituting a wall of the compartment 111, is subjected to a relatively low gaseous pressure when the three way valve 99 is opened to interconnect said compartment with the intake manifold or other source of vacuum. When the latter valve is closed, that is, when the solenoid 121 is de-energized, the compartment 111 is vented to the atmosphere through said valve and the spring 50 within said compartment is then operative to move the piston 31 to the right, Figure 1, to permit a re-engagement of the friction clutch by the operation of its springs.

Describing how the clutch disengaging, transmission operating and throttle controlling operation of the motor 32 the above referred to leftward movement of the piston 31 serves, during the first increment of movement of the piston, to rotate the crank 20 to disengage the clutch and rotate the cam 77 counterclockwise to bring the stop portion A of said cam opposite the accelerator operated crank 74; and as this operation is being effected the spring 26 is expanded inasmuch as the rod 44 cannot be moved to operate the transmission until after the driving torque is reversed, that is, until after the clutch is disengaged. Now immediately after the clutch plates are moved out of contact with each other to reverse the driving torque, the above described force transmitting means interconnecting the spring loaded crank 24 and the crank 14 becomes operative to move the latter crank and establish the transmission in its high gear setting; and as this operation of the transmission is being completed the motor operated switch 169 is operated to make the switch 165, 171 and to break the switch 171, 179. The switch 167, 171 is broken during the first increment of movement of the piston 31; and the switch 171, 179 and its connection with the circuit between the switch 95 and the battery insures a completion of the high gear transmission operating operation of the motor 32 once initiated. The switch 171, 179 is broken when the high gear operation of the transmission is completed and as described above the breaking of this switch results in a deenergization of the solenoids 121 and 11; and this results in a de-energization of the motor 32 to initiate a controlled reengagement of the clutch, a preselecting operation of the alternator 39', adn a controlled opening of the throttle.

The transmission will now remain in its high gear setting until the car is slowed down below governor speed and the accelerator is released to energize the motor whereupon the throttle will be closed and the motor 32 will again be energized to establish the transmission in its second gear setting, the clutch being disengaged to facilitate said operation. If the car is then brought to a stop without neutralizing the transmission, that is, leaving the shift lever in its automatic setting, the operation of the fluid coupling of the power plant will obviate a stalling of the engine despite the relatively high gear ratio setting of the transmission and despite the fact that the idling engine is at the time directly connected to the then stationary propeller shaft of the vehicle.

Again discussing the most important feature of my invention, the driver may, in order to pass a car on the road or facilitate the climbing of a hill, wish to place the transmission in its second gear setting at a time when the car is travelling at a relatively high speed, that is, above governor speed; and to accomplish this result he need but release the accelerator to effect a closing of the switch 95 and depress the clutch pedal 38 sufficiently to close the switch 190 and open the switch 191. As will be noted from a study of the electrical hook up of Figure 2 and from the description of the mechanism of my invention set forth above, this operation results in the energization of the motor 32 to effect the desired second gear setting of the transmission, the operation of the solenoid 11 and the cam 77 serving to insure a closure of the throttle as the clutch is being disengaged and the transmission operated. With this operation the opening of the switch 191 insures a de-energization of the motor 32 immediately after the second gear setting of the transmission is completed; and as described above, as the motor 32 is being de-energized, that is, when the piston 31 is returning to its clutch engaged position, the opening of the throttle is controlled, assuming of course that the driver depresses the accelerator during this operation; and the choke valve 131 serves, during this operation of the motor, to effect a stage engagement of the clutch. The latter operation is assured, inasmuch as the degree of opening of the throttle during the stage clutch engaging operation of the motor 32 is insufficient to reduce the intake manifold vacuum to a factor which would result in an opening of the switch 95.

It is to be particularly noted that the driver may, after he has depressed the clutch pedal to effect the above described second gear operation of the transmission, hold the clutch in its disengaged position merely by maintaining his foot on said pedal to hold the same in its clutch disengaged position; and he may then effect a manually controlled re-engagement of the clutch by releasing the clutch pedal in a conventional manner, that is, so releasing the pedal as to effect the desired smooth engagement of the clutch.

There is thus provided a simple, effective and efficient manually and power operated mechanism for operating the transmission, clutch and throttle of an automotive vehicle; and the clutch pedal, the shift lever and the accelerator constitute the only manually operated controls of said mechanism. With the mechanism of my invention the driver may manually operate the clutch and the three speeds forward and reverse transmission in a conventional manner, that is, by operating the clutch pedal and by effecting the H movement of the shift lever; then if he desires an automatic operation of the transmission to alternately establish the same in its second and high gear settings he has only to move the shift lever from its second gear setting to its automatic setting. Thereafter for all normal straight ahead driving of the vehicle the driver need only operate the accelerator.

Briefly reviewing the operation of the mechanism, to effect this shuttling operation of the transmission between its second and high gear settings it will be assumed that the transmission is established in second gear; then when the car is speeded up above governor speed and the accelerator is released to close the switch 95, the motor 32 is energized to disengage the clutch and simultaneously operate the cam 86 as a stop to to prevent an opening of the throttle, and then operate the transmission to establish the same in its high gear setting. The solenoid 11 is at this time energized to supplement the operation of the cam 77 in maintaining the throttle closed. As the high gear operation of the transmission is being completed the motor is de-energized to thereby initiate a stage clutch engaging operation of said motor said operation cooperating with an operation of the cam 86 to control the opening of the throttle assuming that the accelerator is at the time depressed; and as this clutch engaging operation of the motor 32 is being effected the alternator 39' is operated to prepare the mechanism for a subsequent second gear operation of the transmission. The cycle of operations of the mechanism to effect the latter operation of the transmission duplicates the above described operation; accordingly, a description of said operations will not be repeated here. It is to be particularly noted that with a normal operation of the car, the cycle of clutch and transmission operating and throttle controlling operations of the motor is completed once initiated and despite a depression of the accelerator during said cycle of operations; and it is also to be noted that the driver may, at will, effect a kick-down, that is second gear, operation of the transmission merely by depressing the clutch pedal sufficiently to operate the switches 190 and 191.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In the power plant of an automotive vehicle the combination with a manually operable clutch pedal and a change speed transmission, of power means for operating the transmission to alternately effect two settings thereof, said means including a fluid pressure operated motor operably connected to the transmission, valve means for controlling the operation of said motor to effect an energization and then automatically effect a de-energization of the motor in its operation of the transmission, and means for controlling the operation of said valve means comprising a vehicle speed responsive governor, electro-magnetic means operably connected to the valve, selector switch means including two switches, operated by said governor, a motor operated selector switch mechanism including two switches, one of the same being electrically connected in series with the electro-magnetic means and with one of the governor operated switches and the other being electrically connected in series with the electro-magnetic means and with the other of the governor operated switches, and clutch pedal operated switch means operative to overrule an operation of the governor operated switch means in its control of the mechanism.

2. In the power plant of an automotive vehicle the combination with a manually operable clutch pedal and a change speed transmission, of power means for operating the transmission to alternately effect two settings thereof, said means including a fluid pressure operated motor operably connected to the transmission, valve means for controlling the operation of said motor to effect an energization and then automatically effect a de-energization of the motor in its operation of the transmission, and means for controlling the operation of said valve means comprising a vehicle speed responsive governor, electro-magnetic means operably connected to the valve, a single pole double throw selector switch means operated by said governor, a motor operated selector switch mechanism including two switches, one of the same being electrically connected in series with the electro-magnetic means and with one of the switches of the governor operated switch means and the other being electrically connected in series with the electro-magnetic means and with the other of the switches of the governor operated switch means, and clutch pedal operated switch means including a plurality of breaker switches, operative to overrule an operation of the governor operated switch means in its control of the valve control means.

3. A mechanism for operating a change speed transmission to alternately effect first one and then the other of two of its settings, said mechanism comprising a single acting pressure differential operated motor operably connected to the transmission said connection including a direction changing mechanism, valve means for controlling the operation of said motor to effect an energization and then automatically effect a de-energization of the motor in its operation of the transmission, and means for controlling the operation of said valve means including a single pole double throw electrical switch mechanism, means for controlling the operation of the latter switch including a governor, a selector switch mechanism, including two switches, operated by the motor one of said switches being electrically connected in series with one of the switches of the single pole double throw switch mechanism and the other of said switches being electrically connected in series with the other switch of the single pole double throw switch mechanism; and manually operated switch means, including a plurality of breaker switches, for overruling the aforementioned governor operated switch in its control of the valve means.

4. A mechanism for operating a change speed transmission of the power plant of an automotive vehicle whereby the transmission is alternately established first in one of its settings and then in another of its settings; said mechanism including a single acting pressure differential operated motor operably connected to the transmission, valve means, including a three-way valve, for controlling the operation of said motor, and electrical means for controlling the operation of said valve means including a single pole double throw switch mechanism, means, including a vehicle speed responsive governor and a spring, for controlling the operation of said switch mechanism, a selector switch mechanism, including two switches, operated by the motor, one of the same being electrically connected in series with one of the switches of the single pole double throw switch mechanism and the other of said switches being electrically connected in series with the other switch of the single pole double throw switch mechanism, said selector switch mechanism being operative both as a means for preselecting an electrical circuit of the electrical means and as a means for automatically breaking an electrical circuit of the electrical means just as the operation of the transmission is being completed; together with manually operated switch means operated by the clutch pedal of the power plant and operative to overrule the operation of the single pole double throw switch in its control of the valve controlling electrical means.

5. In an automotive vehicle provided with a change speed transmission, a friction clutch, and a clutch pedal for operating said clutch; means for operating the transmission including power means for shuttling the transmission back and forth between two of its settings, said power means comprising a pressure differential operated motor, valve means for controlling the operation of said motor, means for operating the valve means including electro-magnetic means, and means for controlling the operation of the electro-magnetic means including a source of electrical energy, a manually operated selector switch, a single pole double throw switch mechanism, a vehicle speed responsive governor for actuating said switch mechanism, a selector switch mechanism including three switches, one of the same being electrically connected in series with the electro-magnetic means and with one of the switches of the single pole double throw switch mechanism, another of said switches being electrically connected in series with the electro-magnetic means and with the other of the two switches of the single pole double throw switch mechanism, and the third of said switches being electrically connected with the manually operated selector switch, the latter selector switch mechanism being actuated by the motor and operative, in cooperation with other parts of the control means, to insure an energization of the electro-magnetic means until the motor has completed its operation of the transmission and also operative, in cooperation with other parts of the control means, to automatically operate the control means to de-energize the electro-magnetic means, and thereby effect a de-energization of the motor, when the operation of said motor is completed; together with a clutch pedal operated switch means operative to overrule the control operation of the aforementioned governor operated switch mechanism and thereby effect a certain transmission operating operation of the motor and also make possible a manually controlled engagement of the clutch.

6. In an automotive vehicle provided with a change speed transmission, a friction clutch, and a clutch pedal for operating said clutch; means for operating the transmission and clutch including power means for shuttling the transmission back and forth between two of its settings and for operating the clutch to facilitate the operation of the transmission, said power means comprising a pressure differential operated motor operably connected to the transmission and clutch, valve means for controlling the operation of said motor, means for operating the valve means including electro-magnetic means, and means for controlling the operation of the electro-magnetic means including a single pole double throw switch mechanism, a vehicle speed responsive governor for actuating said switch mechanism, a selector switch mechanism, including a plurality of fixed contacts one of which is electrically connected to one of the fixed contacts of the aforementioned switch mechanism and another of which is electrically connected to the other of the fixed contacts of the aforementioned switch mechanism, actuated by the motor and operative, in cooperation with other parts of the control means, to insure an energization of the electro-magnetic means until the motor has completed its operation of the transmission and clutch and also operative, in cooperation with other parts of the control means, to automatically operate the control means to de-energize the electro-magnetic means, and thereby effect a de-energization of the motor, when the operation of said motor is completed; together with a clutch pedal operated switch means, including a breaker switch which is made when the clutch pedal is substantially depressed and a breaker switch which is broken when the clutch pedal is so operated, operative to overrule the control operation of the aforementioned governor operated switch mechanism and thereby effect a certain transmission operating operation of the motor and also make possible a manually controlled engagement of the clutch.

7. In an automotive vehicle provided with a power plant including a change speed transmission, an internal combustion engine having an intake manifold, an internal combustion engine controlling throttle valve, and a friction clutch; means for operating the transmission to alternately establish first one and then the other of two of its settings and to operate the throttle valve and clutch to facilitate said operations of the transmission, said means including a clutch and transmission operating pressure differential operated motor, valve means for controlling the operation of said motor, a throttle operating solenoid operative to close the throttle when the motor is operating to operate the transmission, and means, including electrical means, for controlling the operation of said motor and solenoid including an intake manifold vacuum operated motor and an electrical switch operated by said latter motor said switch being closed by said motor after the throttle valve is closed to idle the engine, the latter operation serving to initiate an operation of the control means to effect an operation of the motor and solenoid.

8. In an automotive vehicle provided with an accelerator and a change speed transmission, power means for operating the transmission to alternately establish the same in first one and then the other of two different settings, said power means including a pressure differential operated motor, valve means for controlling the operation of said motor, and electrical means for controlling the operation of said valve means including a grounded solenoid, a grounded battery, and electrical means interconnecting said battery and solenoid including a single pole double throw switch, a vehicle speed responsive governor for operating said switch, a motor operated selector switch including three fixed contacts and a movable contact one of said fixed contacts being electrically connected to one of the contacts of the governor operated switch and the other of said switch contacts being electrically connected to the other of the fixed contacts of said governor operated switch, electrical means, including a switch controlled by an operation of the accelerator, interconnecting the battery and governor operated switch, electrical means interconnecting one of the fixed contacts of the motor operated switch with the aforementioned electrical means interconnecting the battery and governor operated switch the point of connection lying between the battery and the accelerator controlled switch; and switch means operative to overrule the governor operated switch means to effect, at the will of the driver, an operation of the mechanism to establish the transmission in one of the aforementioned two settings.

9. In an automotive vehicle provided with a manually operated clutch pedal and a change speed transmission, power operated means operative to alternately effect two different settings of the transmission said means including a pressure differential operated motor, valve means for controlling the operation of said motor, and means for controlling the operation of said valve means including a grounded valve operating electro-magnetic means, a motor operated switch mechanism operative, when the transmission is established in either one of the aforementioned two settings, to close a switch and thereby prepare the mechanism for a subsequent operation and also operative, in cooperation with other electrical parts of the power means, to maintain the electro-magnetic means energized during the operation of the transmission operating power means and until the transmission is established in gear, a vehicle speed responsive governor, switch means operated by said governor, a grounded battery, electrical means interconnecting said battery and governor operated switch, electrical means interconnecting the governor operated switch, the motor operated switch mechanism and the grounded electro-magnetic means; and clutch pedal operated switch means for controlling the operation of said electro-magnetic means and operative to supplement the governor operated switch means in the control of the power means.

10. In an automotive vehicle provided with a manually operated clutch pedal, an accelerator, and a change speed transmission, power operated means operative to alternately effect two different settings of the transmission said means including a pressure differential operated motor, valve means for controlling the operation of said motor, and means for controlling the operation of said valve means including a grounded valve operating electro-magnetic means, a motor operated switch mechanism operative, when the transmission is established in either one of the aforementioned two settings, to close a switch and thereby prepare the mechanism for a subsequent operation and also operative, in cooperation with other electrical parts of the power means, to maintain the electro-magnetic means energized during the operation of the transmission operating power means and until the transmission is established in gear, a vehicle speed responsive governor, a single pole double throw switch means operated by said governor, a grounded battery, electrical means, including a switch controlled in part by an operation of the accelerator, interconnecting said battery and governor operated switch, electrical means interconnecting the governor operated switch, the motor operated switch mechanism and the grounded electro-magnetic means; and clutch pedal operated switch means for controlling the operation of said electro-magnetic means and operative to supplement the governor operated switch means in the control of the power means.

EARL R. PRICE.

REFERENCES CITED

The following references are of record in the file of this patent:

UNITED STATES PATENTS

| Number | Name | Date |
| --- | --- | --- |
| 2,051,553 | Fleischel | Aug. 18, 1936 |
| 2,098,691 | Neff | Nov. 9, 1937 |
| 2,267,464 | Iavelli | Dec. 23, 1941 |
| 2,291,690 | Caves | Aug. 4, 1942 |
| 2,292,253 | Thurber | Aug. 4, 1942 |
| 2,296,290 | Mayrath | Sept. 22, 1942 |
| 2,328,291 | Osborne | Aug. 31, 1943 |
| 2,386,174 | Randol | Oct. 2, 1945 |